US011876838B2

(12) United States Patent
Imbimbo et al.

(10) Patent No.: US 11,876,838 B2
(45) Date of Patent: Jan. 16, 2024

(54) LAWFUL INTERCEPTION CHAIN IN SERVICE PROVIDING NETWORKS

(71) Applicant: TELEFONAKTIEBOLAGET LM ERICSSON (PUBL), Stockholm (SE)

(72) Inventors: Amedeo Imbimbo, Caivano (IT); Mario Ascione, Torre del Greco (IT); Francesca Marfia, Pagani (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 330 days.

(21) Appl. No.: 17/281,788

(22) PCT Filed: Oct. 4, 2018

(86) PCT No.: PCT/SE2018/051016
§ 371 (c)(1),
(2) Date: Mar. 31, 2021

(87) PCT Pub. No.: WO2020/071972
PCT Pub. Date: Apr. 9, 2020

(65) Prior Publication Data
US 2021/0385255 A1 Dec. 9, 2021

(51) Int. Cl.
*H04L 9/40* (2022.01)
*H04L 47/34* (2022.01)
(52) U.S. Cl.
CPC .......... *H04L 63/306* (2013.01); *H04L 47/34* (2013.01)

(58) Field of Classification Search
None
See application file for complete search history.

(56) References Cited

U.S. PATENT DOCUMENTS

2004/0095894 A1* 5/2004 Eloranta ............... H04W 12/80
370/252

OTHER PUBLICATIONS

International Search Report / Written Opinion dated Jun. 26, 2019 in related/corresponding PCT Application No. PCT/SE2018/051016.
Universal Mobile Telecommunications System (UMTS); LTE•3G security; Lawful interception requirements (3GPP TS 33.106 version 14.0.0 Release 14), Apr. 2017, pp. 1-27.

* cited by examiner

*Primary Examiner* — Brandon Hoffman
(74) *Attorney, Agent, or Firm* — PATENT PORTFOLIO BUILDERS PLLC

(57) ABSTRACT

Methods and devices employed in providing lawful interception (LI) by products related to a service session of an LI target as a unique chain. The packets sent to a legal enforcement agency are chained and have shorter headers. The number of packets is reduced by including both intercept-related information (IRI) and content of communications (CC) in the same packet if time-wise appropriate.

10 Claims, 7 Drawing Sheets

LAWFUL INTERCEPTION CHAIN IN SERVICE PROVIDING NETWORKS

TECHNICAL FIELD

Embodiments of the subject matter disclosed herein relate to lawful interception in service providing networks, more specifically, to a mechanism for creating a unique interface and data flow for both the intercept-related information and the content of communications.

BACKGROUND

Lawful interception, LI, is a term used in networks context that refers to hardware and software operating to provide information related to individual subscribers' use of network services to law enforcement agencies, LEAs, when legally requested. For standardized networks, the LI hardware and software have been standardized by telecommunication standardization organizations (see, e.g., 3GPP TS 33.106 on Lawful Interception Requirements).

A conventional LI model for interception is illustrated in FIG. 1. On the LEA side, a law enforcement monitoring facility (LEMF) 110 sends an intercept request identifying an interception target to the network operator's administration function 120 via a first handover interface HI1. The intercept request triggers a point of interception, POI, 130 to provide interception-related data to delivery functions DF2 and DF3 (labeled 140 and 150 in FIG. 1) that forward this information to the LEMF. DF2 forwards the intercept related information, IRI, via handover interface HI2, and DF3 forwards the contents of communication, CC, via handover interface HI3. CC and IRI forwarded to LEMF are related to the target's communications (phone calls, messaging, etc.) and other services intermediated by the network operator.

In the 5G network scenario, a growing number of applications are expected (from Over-The-Top players and Internet-Of-Things scenarios). From an LI perspective, this means, on one hand, new services to intercept, and, on the other hand, a huge number and new types of information to be provided to LEMFs. This volume increase is going to amplify problems already observed in current 4G networks, as in the case of VoLTE interception.

With VoLTE calls, CC is becoming of crucial importance since it carries the intercepted voice. Thus, the focus on CC mediation has increased in the last few years. Moreover, customers are often asked to prove evidence of delivered CC. Having two different interfaces leads to high computational costs for correlating information received on both interfaces. For example, when session-based correlation is required on HI interfaces, parameters calculated in the mediation function MF2 (which generates the IRI report forwarded via HI2) have to be provided to the mediation function MF3 (which generates the CC report forwarded via HI3) for the IRI/CC correlation. In addition, a network operator is required to also spend a lot of time interpreting statistics and making a correlation between them.

LEMF also spends time and computing resources to buffer and process information received via HI2 and HI3. Information is duplicated, i.e., most HI3 useful information is also on HI2 header or vice versa. LEMF's so-called "post-processing phase" has impact in terms of performance and development costs. For example, the RTP (Real-time Transport Protocol) codec field is required by LEMF to rebuild the call from the RTP flow in a VoLTE session. Part of the RTP information was provided in HI2 and the other part in HI3. Another example of this problem is the PDHIR (Packet Data Header Information Report) that is conveyed on the HI2 with information retrieved from X3 (the interface fetching CC from POI 130 to DF3).

Currently, some information delivered within IRI and CC is redundant. LI headers repeat with each CC and IRI delivery, as illustrated in FIG. 2. LI header 1 and LI header 2 contain information (such as correlation number and target information) that is the same for all IRI and CC packets related to the same interception session.

The DF2 and DF3 interworking mechanisms could become a more serious problem in 5G networks where low latency and increased data processing volume are required. In an IOT scenario, where IRI/CC packets size can be very small, having separate IRI/CC interfaces can lead to inefficient bandwidth usage.

There is a need to provide mechanisms for improving LI for both network operators' and LEAs' benefit.

SUMMARY

Embodiments described hereinafter are methods and devices using a chain for LI to decrease the redundancy of information sent to the LEA and to provide a more efficient interface.

According to an embodiment, there is a method performed by a network operator providing a LI service to a LEA. The method includes determining a chain identifier, chainID, based on information related to an LI target and a service session of the LI target. The method further includes transmitting packets related to the service session to the LEA as a unique chain, each packet including a chain header with the chainID and a sequence number, which is a packet counter, and at least one of IRI and CC.

According to another embodiment, there is a network operator device configured to provide a LI service to a LEA. The device includes an interface and a data processing unit. The interface is configured to acquire IRI and CC related to an LI target and a service session of the LI target. The data processing unit is configured to cause determining a chainID based on information related to the LI target and the service session, and to control the interface to transmit packets related to the service session to the LEA as a unique chain. Each packet includes a chain header with the chainID and a sequence number, and at least one of IRI and CC.

According to yet another embodiment, there is a network operator arrangement for providing LI service to a LEA, the network operator arrangement including a first module and a second module. The first module is configured to determine a chainID based on information related to a LI target and a service session of the LI target. The second module is configured to transmit packets related to the service session to the LEA as a unique chain. Each packet includes a chain header with the chainID and a sequence number, and at least one of IRI and CC.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments are related to LI.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, particular features, structures or functions may be combined in any suitable manner in one or more embodiments.

Various embodiments described in this section provide hardware and software for an LI chain. In this approach, a unique interface is used for both CC and IRI replacing HI2 and HI3. On this interface CC data may be sent together with the IRI data. The LI header conventionally associated with an interception and repeated in each LI packet is replaced by a unique interception identifier called a "chainID" used to tie together IRI/CC of the same interception. A similar approach may be extended to X interfaces.

Figure 1:
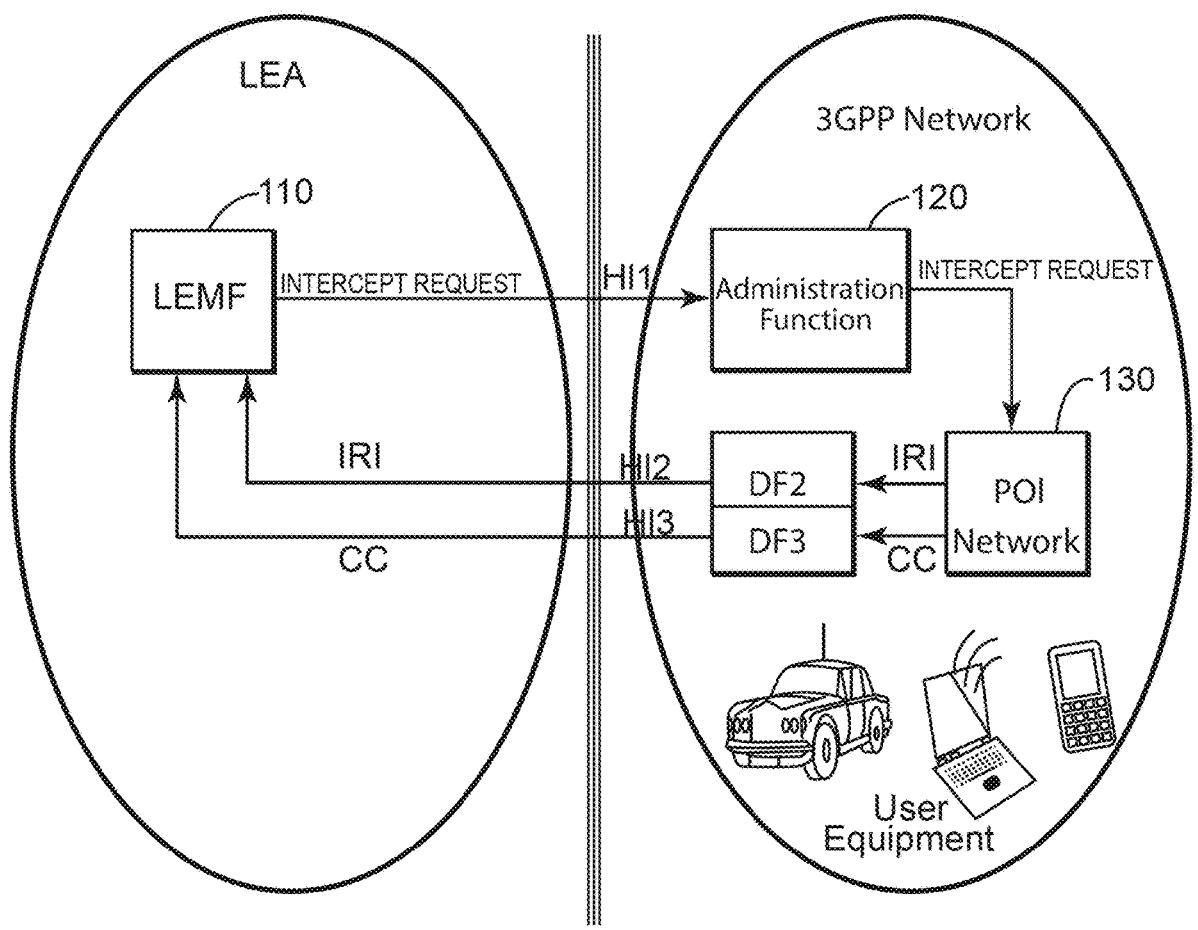
FIG. 1 illustrates a conventional LI model.
Figure 2:
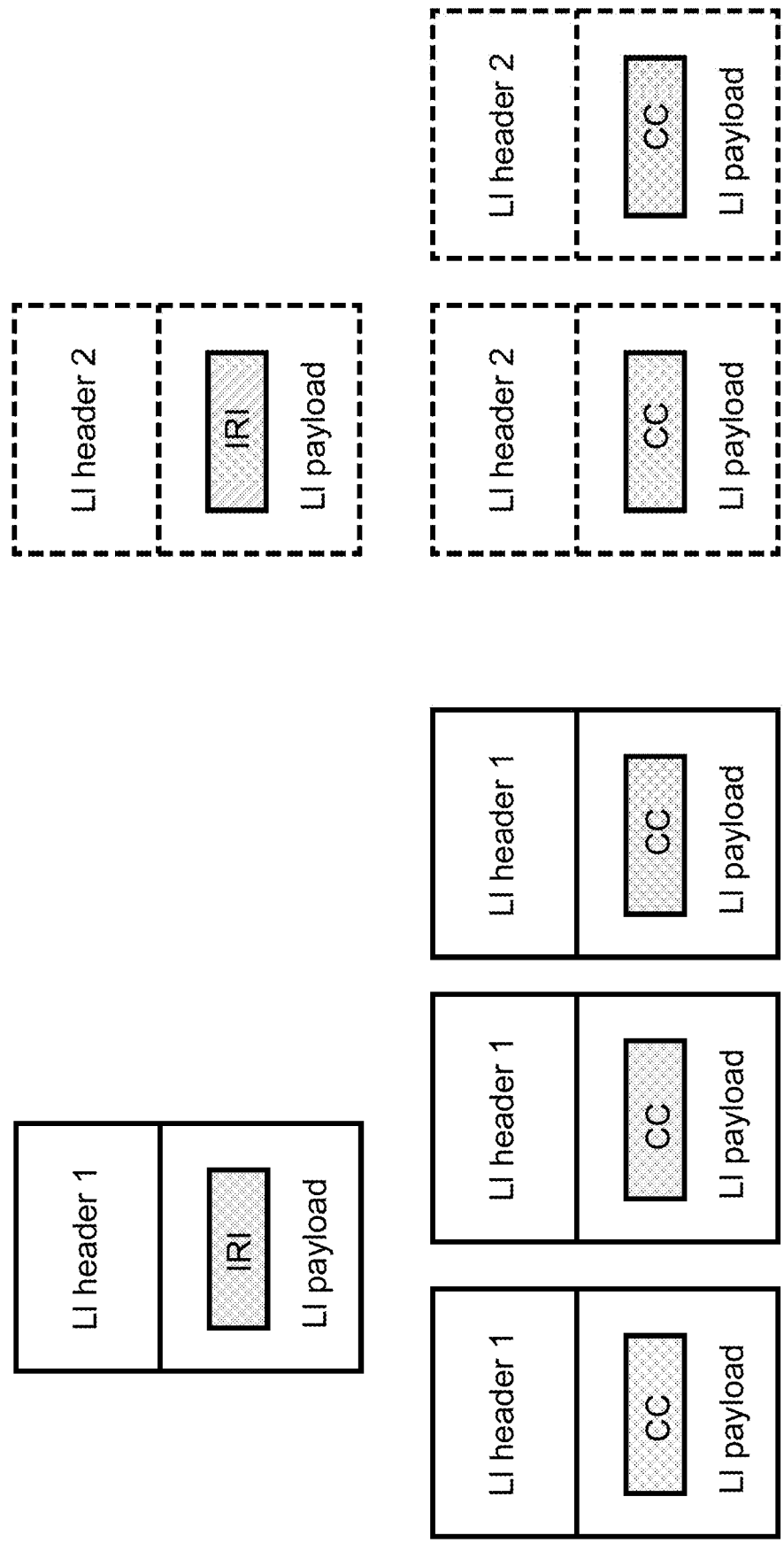
FIG. 2 illustrates packets conventionally provided to LEA for two interceptions.
Figure 3:
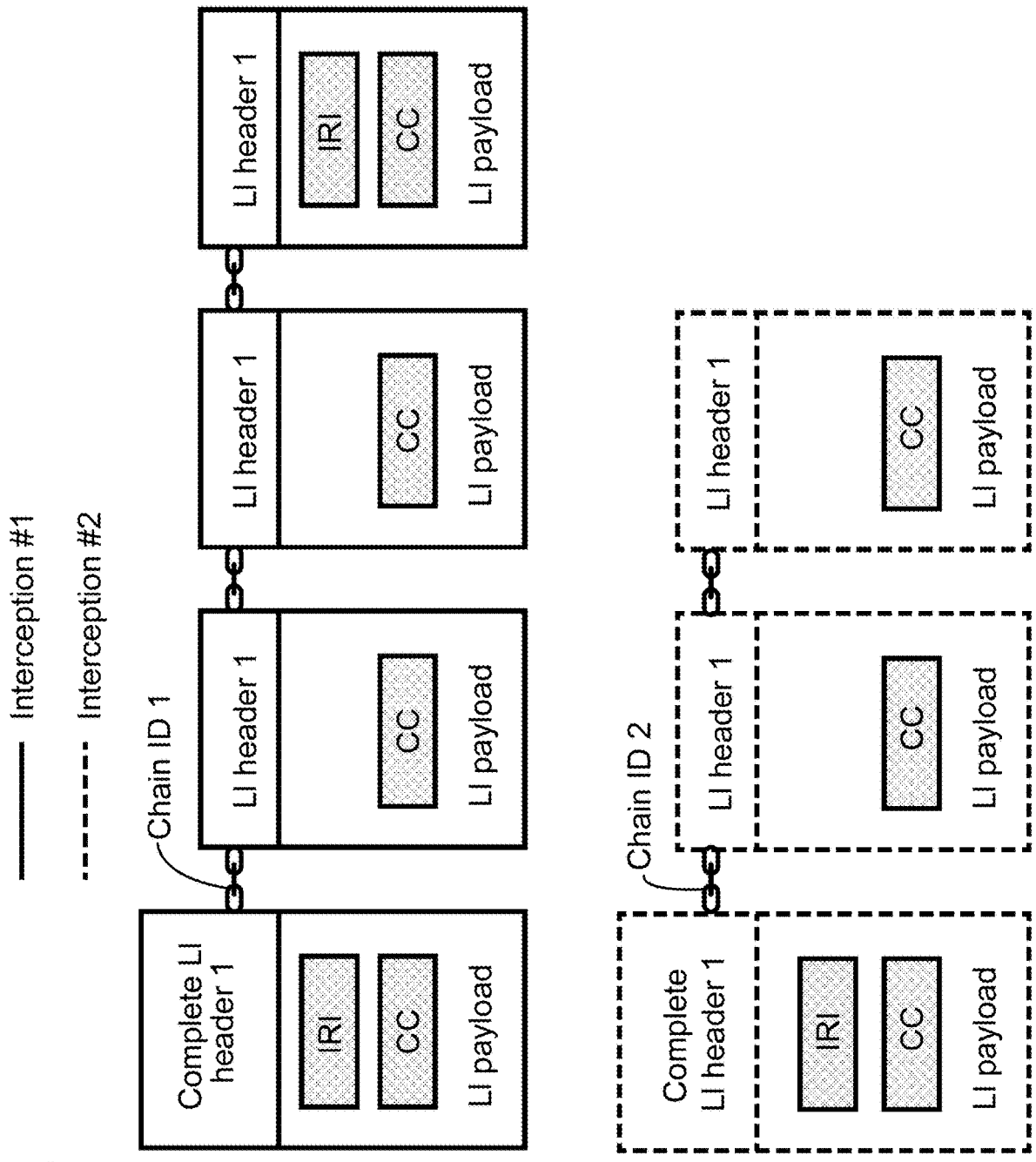
FIG. 3 illustrates chain packets provided to LEA for two interceptions according to an embodiment.

LI chain links together IRI and CC of the same interception. For example, FIG. 3 illustrates chains related to two interceptions. A chain is identified by a unique identifier, chainID, calculated when the first IRI for an interception is received based on the following information: (1) Target Type (e.g., whether only IRI or both IRI and CC are forwarded), (2) Target Number (e.g., a target identifier), (3) Lawful Interception Identifier (LIID) uniquely associated with an intercept request and (4) a Correlation Number (for correlating IRI, CC). All IRI and CC packets belonging to the same intercepted chain have the same chainID.

According to an embodiment, as illustrated in FIG. 3, the complete header of the first packet of a chain (which has as payload at least the first IRI, but may also include CC information) includes the following info: (i) ChainID, (ii) Target Type, (iii) Target Number, (iv) LIID, (v) the Correlation Number, (vi) a Sequence Number (enabling tracking of the sequence of packets in the same interception), and (vii) a Timestamp.

Following packets having as payload IRI and/or CC belonging to the same intercepted chain have a shorter header including only: (i) the ChainID, (ii) the Sequence Number and (iii) Timestamp.

As mentioned above, some embodiments allow transmitting both IRI and CC in the same LI packet, when the IRI and CC are processed for delivery (e.g., by a Mediation Device) in the same time.

Hereinafter, an example of a chained packet (in JavaScript Object Notation, Json, format, but this format is not mandatory) reads:

```
{       "chainId": 1,
        "contentTimestamp": "2018-05-30 11:10:12",
        "sequenceNumber": 23456,
        "ChainContent":
        {
                "ContentType": IRI
                "Content": 0x1234567890
        }
        "ChainContent":
        {
                "ContentType": CC
                "Content": 0x6543217890
        }
}
```

The unified interface doesn't inhibit the possibility to activate IRI- or CC-only interception. Having a unique interface toward an agency enables using the Transport Control Protocol (TCP). Alternatively, the Reliable User Datagram Protocol (RUDP), which is a transport layer protocol, may be used in order to achieve a higher Quality of Service by implementing features that are similar to TCP/IP with less overhead. The protocol aims to provide a solution where a User Datagram Protocol is too primitive because guaranteed-order packet delivery is desirable, but TCP adds too much complexity and overhead.

Figure 4:
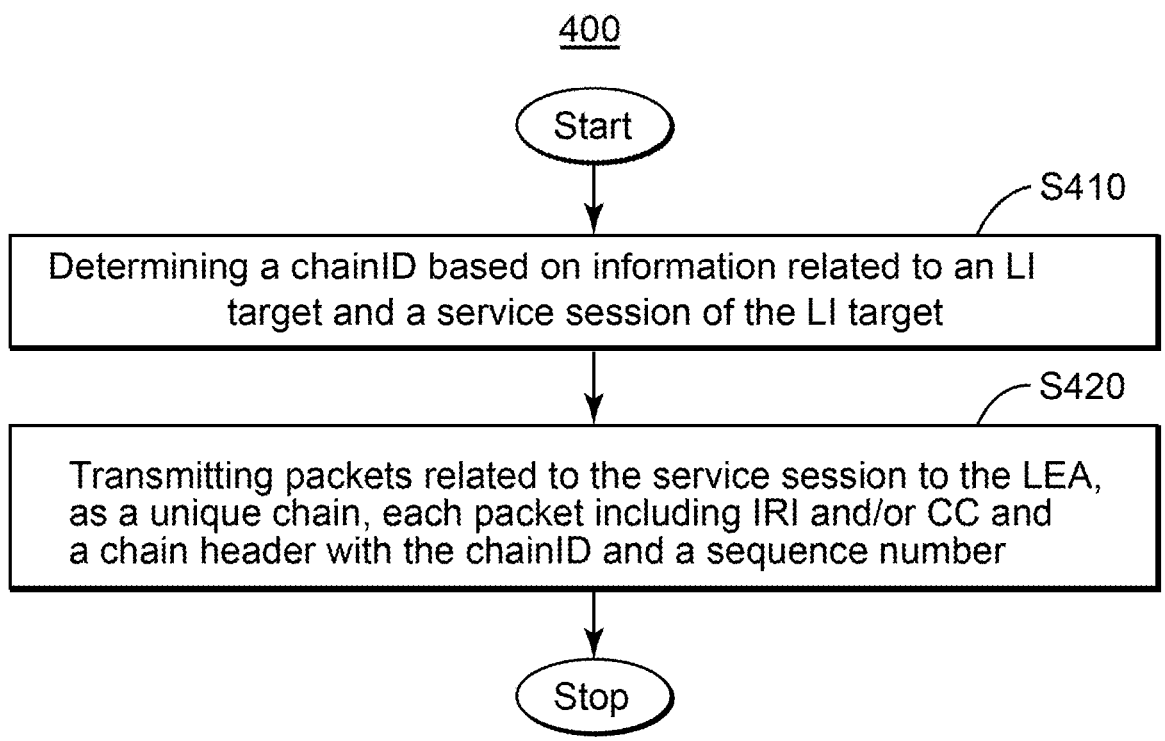
FIG. 4 is a flowchart of a method performed by a network operator providing an LI service to an LEA according to an embodiment.

FIG. 4 is a flowchart of a method 400 performed by a network operator providing an LI service to an LEA according to an embodiment. The method includes determining a chain identifier, chainID, based on information related to an LI target and a service session of the LI target at S410.

The method then includes transmitting packets related to the service session to the LEA as a unique chain at S420. Each packet includes at least one of IRI and CC, and a chain header. The chain header includes the chain ID and a sequence number, which is a packet counter. The chain header also includes a timestamp corresponding to the IRI and/or CC in the packet.

In one embodiment, the chain header of a first packet in a chain includes more information than the chain headers of other packets in the chain. For example, the first chain header may also include the information related to the LI target and the correlation number used to determine the chainID. Some packets may include both IRI and CC if timewise appropriate (i.e., if their forwarding is to occur within a very short time interval, essentially at the same time).

The information related to the LI target and the session used to determine the chainID may include a target type, a target identifier, a lawful interception identifier and a correlation number for the session.

Method 400 may be performed in the cloud so the determining of the chainID and the transmitting of the packets may be performed by different physical devices.

Figure 5:
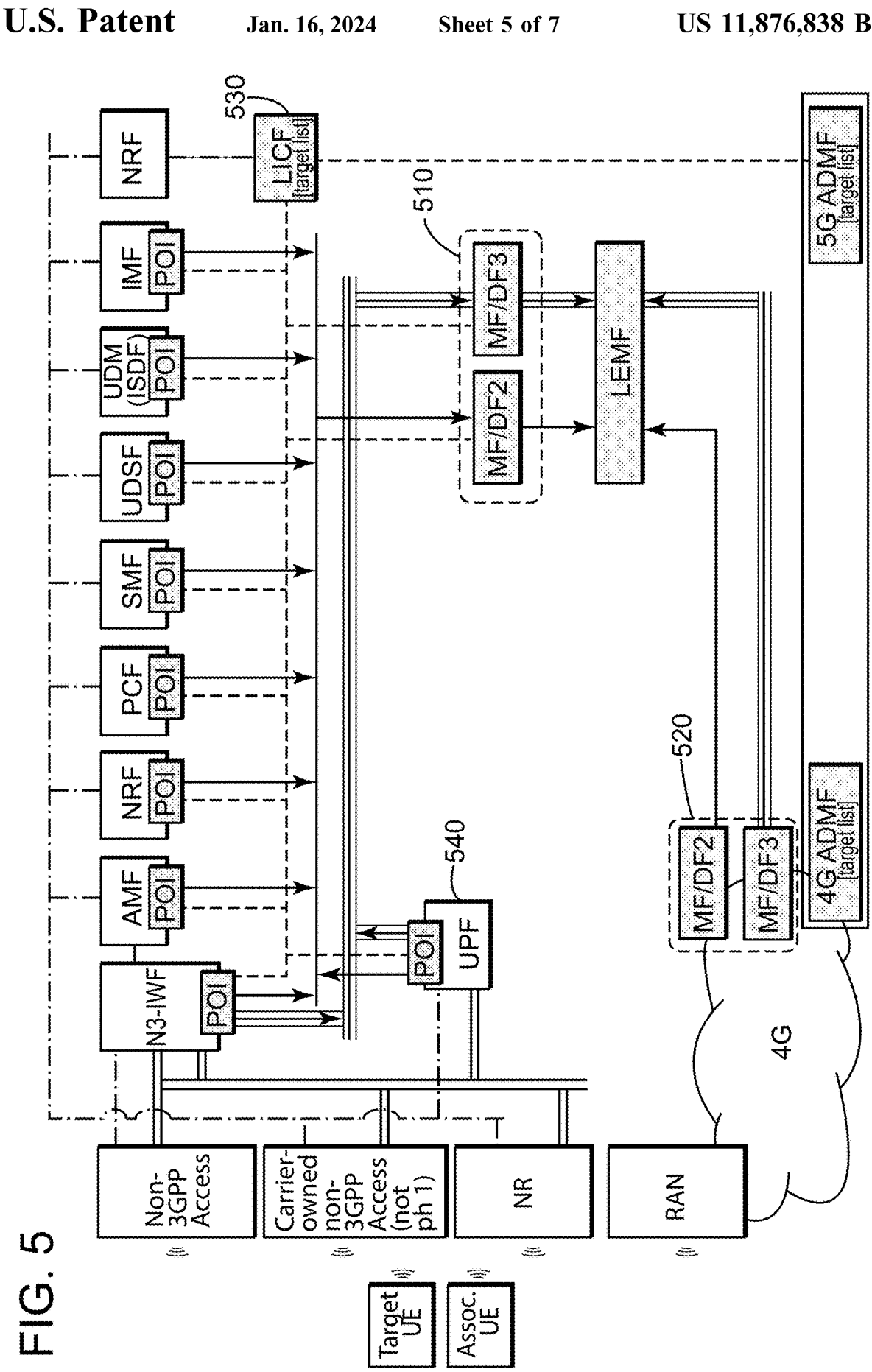
FIG. 5 illustrates a 5G service-based LI architecture according to an embodiment.

Method 400 may be executed on hardware operating and organized according to a 5G type LI architecture (not yet standardized set forth according to the up-to-date design). FIG. 5 illustrates such a 5G type LI architecture that includes an LI-related control bus (illustrated using dotted lines) and two LI product interception busses: one for IRI illustrated as a continuous line and one for CC illustrated with three lines. FIG. 5 also includes two other non-LI-related busses: a control plane bus (illustrated using dash-point lines) and a user plane bus (illustrated using double lines). The network functions, NF, are illustrated using white boxes and LI-related functions are illustrated using gray boxes. FIG. 5 shows that one or both of the mediation function/delivery functions, MF/DF2 and MF/DF3 pairs may be replaced by single network/LEA interfaces 510 and/or 520, respectively, according to various embodiments.

In this architecture, the 5G Administrative Function ADMF performs functions similar to pre-5G Administrative Functions, with the difference that it does not control the LI elements in the network directly, but through a newly defined Lawful Interception Control Function, LICF, 530. LICF 530 is both the bus controller and the discovery mechanism for all things LI in the network. One of the benefits of a bus architecture is that POIs and MF/DFs can be instantiated dynamically, under the control of the LICF. The LI layer thus can keep up with the highly dynamic service chain instantiation and modification enabled by 5G. In this architecture, the LICF serves as both bus controller, managing the sources and sinks of the LI information (both IRI and CC), and as a discovery mechanism that all the LI-related functions utilize at startup and during runtime to keep track of ever-changing LI-impacting network conditions. The LICF maintains the "lay of the land" for the whole carrier network, and is centralized functionally, but certainly can, and should, be implemented in a redundant, distributed manner.

The POI 540 on the User Plane Function, UPF, pushes both to the CC bus and the IRI bus (e.g., for packet data header reporting) if needed. POIs and MF/DFs register with the LICF upon startup and receive the necessary parameters to become functional. Among these parameters are target identifiers and the addresses of the MF/DFs associated with each identifier. When the MF/DFs start up, they are provisioned by the LICF with the address of the LEMF(s) associated with each target identifier as well as what services are to be delivered to a particular LEMF and whether IRI only or IRI and CC are to be delivered.

The lifecycle of all LI elements is under the control of the LICF, which serves as bus manager for both the IRI and CC busses, and the lifecycle events of the LI elements, including migrations from one physical device to another.

The most sensitive information in the LI system is the LI target list. This is the list of all the subjects in the network currently under surveillance, whether active, suspended or in any other state. The security measures used by the carrier to ensure unauthorized access to this list is not subject to standardization, but the architectural choices made in the design of the LI system do impact the security of the LI target list directly.

Since completeness of interception product is a legal requirement in most jurisdictions, the LI system must ensure that no events lawfully authorized for interception are missed. To ensure that no events are missed, there are two architectural alternatives. A carrier may choose to deploy the full target list at all POIs, such that when a UE arrives in the network and commences registration, the POI is fully armed and in position to recognize if the LI target identifier is in the LI target list. The choice to push the full list to every node is the simplest, and arguably the riskiest, since the compromise of any node will leak the complete target list.

Alternatively, a service provider may choose not to broadcast the full target list wholesale in all POIs in the network, but keep the full list in the LICF, and only provision at each POI the specific target identifiers that are present at the particular NF. This alternative introduces a race condition. When the UE appears, the POI must query the LICF to find out if the user identifier is part of the LI target list. As the registration sequence progresses, the NF POI is waiting for a response from the LICF. When the reply arrives, the POI can take action if the reply was positive. If the reply is negative, the POI's involvement ends. If the reply is positive, depending on how long the POI-LICF-POI round trip for the query/reply took, it is possible that some reportable events are missed.

To mitigate the above-identified problem, there are two options. The first option is for the network operator to suspend registration for the time it takes the LICF to answer, thus inducing a registration delay in all registrations, whether the user is a target or not. The second option is for the network operator to cache the reportable registration events while the POI-LICF-POI query is running, and either report them if the answer is positive, or delete them if the answer is negative.

When a new target is provisioned in the LI system, after the LI target is already registered in the service provider network, the service provider is faced with the race condition consequences of the implementation choice made as described above. The LICF may either wholesale pre-arm every POI with the new target (and expect every POI to immediately start interception on the new target), or, the LICF may poll every POI for all UEs, and arm the associated POI (and start interception) only if a target UE is discovered to be served by that particular NF. The second approach would take comparatively longer and would be expected to miss more pre-existing target interactions with the network than the first approach.

Figure 6:
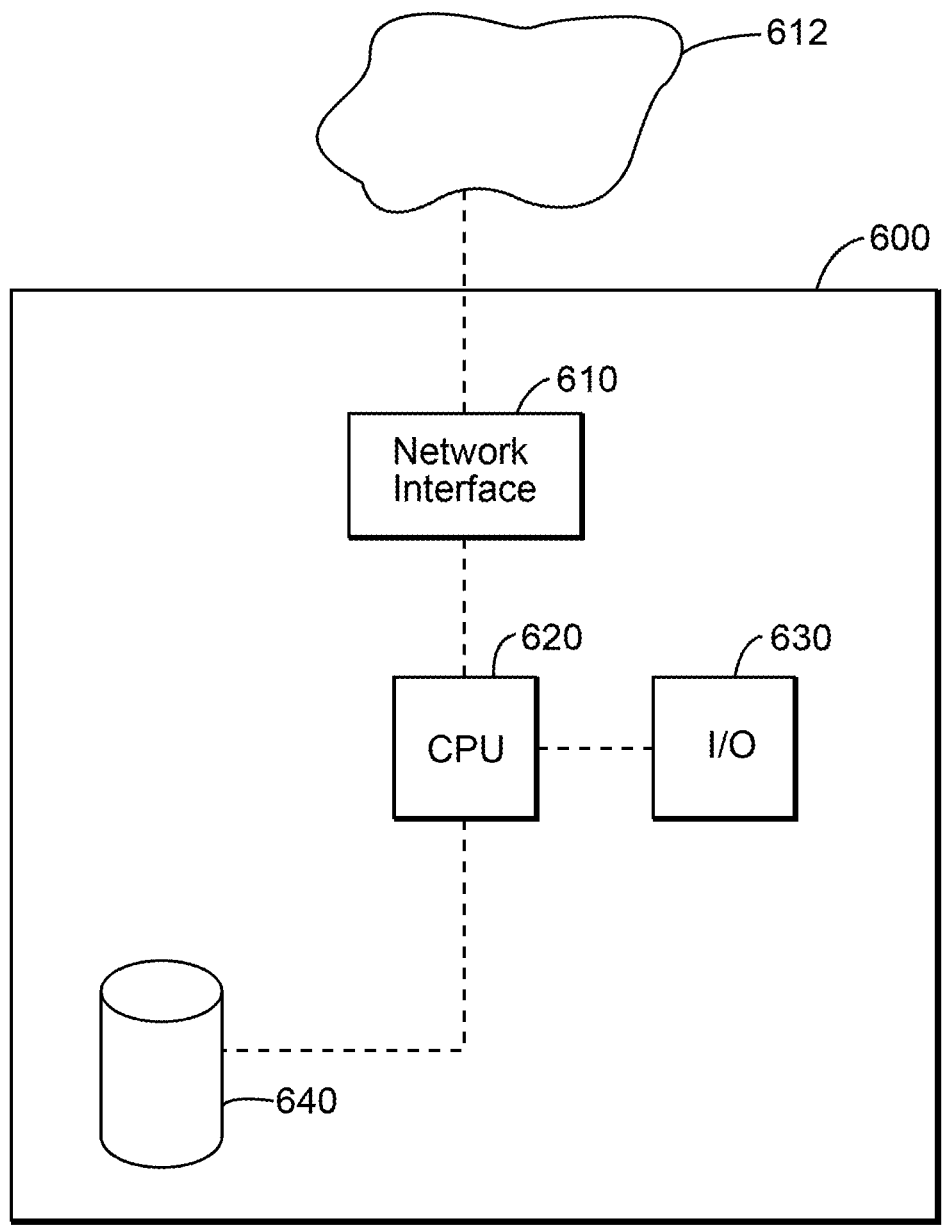
FIG. 6 is a diagram of hardware and software of an apparatus configured to automatically deliver LI chain packets according to another embodiment.

FIG. 6 is a schematic diagram of hardware and software of network operator device 600 configured to automatically deliver LI chain packets according to an embodiment. The operator device 600 may execute LI functions such as for interfaces 510 and 520 in FIG. 5. The device includes an interface 610 and a data processing unit 620. Interface 610 is configured to acquire IRI and CC related to an LI target and a service session of the LI target. The data processing unit 620, which includes at least one processor and is connected to interface 610, is configured to cause determining a chainID based on information related to the LI target and the session, and to control the interface to transmit chain packets to the LEA. Each chain packet includes IRI and/or CC, and a chain header. The chain header includes the chainID and a sequence number, which is a counter for the packets in the chain.

As already mentioned, the information related to the LI target and the service session used to determine the chainID includes one or more of a target type, a target identifier, a lawful interception identifier and a correlation number for the service session. The chain header also includes a timestamp corresponding to the IRI and/or CC in the packet. The first packet transmitted by device 600 for the service session may have an extended chain header including the information related to the LI target and the session used to determine the chainID in addition to the chainID and the sequence number. In one embodiment, another network device determines the chainID which is then received via the interface.

Device 600 may also include a data storage device 640 (e.g., a hard drive) and a user interface 630. Data storage device 640 may store executable codes (programs), which, when executed by the data processing unit, make the data processing unit perform methods like 400.

Figure 7:
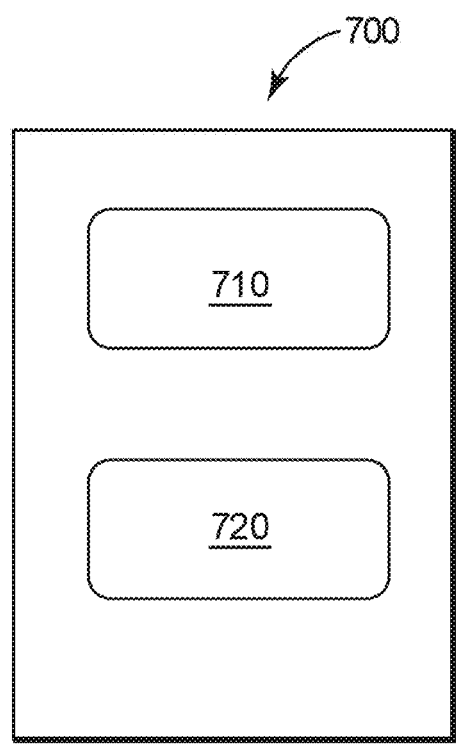
FIG. 7 is a block diagram of a device configured to perform methods according to various embodiments.

FIG. 7 is a block diagram of a network operator arrangement 700 configured to perform methods according to various embodiments. network operator arrangement 700 may be linked and operate as block 510 and 520 in FIG. 5. The network operator arrangement includes a first module 710 configured to determine a chainID based on information related to an LI target and a service session of the LI target. The network operator arrangement further includes a second module 720 configured to transmit packets related to the service session to the LEA as a unique chain, each packet including a chain header with the chainID and a sequence number, which is a packet counter, and at least one of IRI and/or CC. The chain header also includes a timestamp corresponding to the IRI and/or CC in the packet.

The information related to the LI target and the service session used to determine the chainID may include a target type, a target identifier, a lawful interception identifier and/or a correlation number for the service session. The chain header includes a timestamp corresponding to the IRI and/or CC in the packet. The first packet transmitted for the service session may have an extended chain header including the information related to the LI target and the session used to determine the chainID in addition to the chainID and the sequence number.

Having a unique chain between IRI and CC enables network operators to easily provide evidence of LI products delivered to the LEA. Evidence may also be provided using statistics that are related to a unique IRI/CC flow, allowing reduced impact to post-process data.

When using the chain approach of various embodiments, operators are enabled to deploy new services with less impacts for regulatory compliances. This is helpful (i.e., saving time and network resources) especially for new services that involve traffic coming from new interception points like sensors in 5G scenarios. Using one unique interface for IRI/CC provides to the network operators the benefit of more efficient bandwidth usage.

Another advantage of the chain approach is simplifying network designs. A simpler LI mediation system does not handle separate links HI2 and HI3. The chain approach is likely to have a beneficial impact of decreasing, if not solving, current VoLTE problems, and it is also 5G-ready.

From the LEA standpoint, receiving all intercepted information on a unique interface simplifies the processing of IRI/CC, thereby simplifying its own architecture. Having a unique HI2/HI3 chain, information about intercepted traffic can be easily retrieved. The LEA is enabled to rebuild near real-time service sessions with low latency in a smarter way.

The embodiments disclosed in this section describe methods and systems using lawful interception chains to provide lawful interception products to a law enforcement agency in a more efficient and more reliable manner. This description is not intended to limit the invention. On the contrary, the exemplary embodiments are intended to cover alternatives, modifications and equivalents, which are included in the scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments with particular combinations thereof, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method performed by a network operator providing a lawful interception, LI, service to a law enforcement agency, LEA, the method comprising:
   determining a chain identifier, chainID, based on a target type related to an LI target, a target identifier related to the LI target, a Lawful Interception Identifier uniquely associated with an intercept request, and a correlation number for a service session of the LI target; and
   transmitting packets related to the service session to the LEA as a unique chain, each packet including a chain header and at least one of intercept related information, IRI, and content of communication, CC,
   wherein the chain header includes the chainID, a timestamp and a sequence number, which is a packet counter, and wherein the chain header of a first packet transmitted for the service session also includes the target type, the target identifier, the Lawful Interception Identifier, and the correlation number.

2. The method of claim 1, wherein at least one of the packets is configured to include both IRI and CC.

3. The method of claim 1, wherein different physical devices perform the determining of the chainID and the transmitting of the packets.

4. The method of claim 1, wherein the method is executed on hardware operating and organized according to a 5G type of lawful interception architecture.

5. The method of claim 1, further comprising:
   receiving IRI and CC from different interfaces, wherein the transmitting uses a single interface.

6. A network operator device configured to provide a lawful interception, LI, service to a law enforcement agency, LEA, the device including:
   an interface configured to acquire intercept related information, IRI, and contents of communication, CC, related to an LI target and a service session of the LI target; and
   a data processing unit connected to the interface, the data processing unit configured
   to determine or cause determining a chain identifier, chainID, based on a target type related to the LI target, a target identifier related to the LI target, a Lawful Interception Identifier uniquely associated with an intercept request, and a correlation number for the service session; and
   to control the interface to transmit packets related to the service session to the LEA as a unique chain, each packet including a chain header and at least one of intercept related information, IRI, and contents of communication, CC,
   wherein the chain header includes the chainID, a timestamp and a sequence number, which is a packet counter, and wherein the chain header of a first packet transmitted for the service session also includes the target type, the target identifier, the Lawful Interception Identifier, and the correlation number.

7. The device of claim 6, wherein at least one of the packets is configured to include both IRI and CC.

8. The device of claim 6, wherein another network device determines the chainID which is then received via the interface.

9. The device of claim 6, wherein the network device is connected to network operator hardware and software operating and organized according to a 5G type of lawful interception architecture.

10. The device of claim 6, further comprising a non-transitory computer readable medium storing executable codes which, when executed by the data processing unit, make the data processing unit to determine or to cause determining the chainID, and to control the communication interface to transmit the packets related to the service session to the LEA.

* * * * *